UNITED STATES PATENT OFFICE.

FIN SPARRE, OF WILMINGTON, DELAWARE, ASSIGNOR TO THE E. I. DU PONT DE NEMOURS POWDER COMPANY, OF WILMINGTON, DELAWARE, A CORPORATION OF NEW JERSEY.

PROCESS OF MAKING PHENOL ESTERS.

No. 797,024.　　　　Specification of Letters Patent.　　　　Patented Aug. 15, 1905.

Application filed June 1, 1905. Serial No. 263,338.

*To all whom it may concern:*

Be it known that I, FIN SPARRE, a subject of the King of Sweden and Norway, residing at Wilmington, county of Newcastle, and State of Delaware, have invented a new and useful Improvement in Processes of Making Phenol Esters, of which the following is a full, clear, and exact description.

The object of the invention is to cheapen the manufacture of phenol ester by a new mode of utilizing in its manufacture a chlorin halogen compound.

It is known that phenol ester can be made by the reaction between an alkaline salt of phenol and a monohalogen compound of hydrocarbon. This reaction is, as a rule, a rather difficult one and has to be performed at a high temperature—say 200° centigrade. It is also generally necessary to use as the halogen compound the iodid or bromid, because the chlorid makes the reaction more difficult to perform. The chlorid, however, is the cheapest compound. I have found that this reaction can be easily accomplished by means of the chlorids when in alcoholic solution.

To explain the process, I will take anisol as an example. Caustic sodium or caustic potash is dissolved in commercial alcohol, either ethyl alcohol or methyl alcohol, the cheapest being to dissolve the caustic soda in methyl alcohol. To this is then added phenol, in this case carbolic acid, and in this way phenylate of sodium is formed in the alcoholic solution. The sodium phenylate may also be made by heating phenol and caustic alkalies together and then dissolving the product in alcohol. This solution is then preferably heated so that the alcohol boils, a temperature of about 70° centigrade being the best in this case, and methyl chlorid is passed into the solution. Methyl chlorid is a trade product and can be easily obtained; but it can also be easily obtained from the cheap raw materials—common salt, methyl alcohol, and strong sulfuric acid. The mixture of sulfuric acid and methyl alcohol is added to the heated salt and heated during the reaction. The formula for the reaction of anisol is as follows:

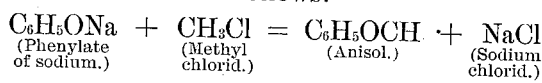
$$\underset{\substack{\text{(Phenylate}\\\text{of sodium.)}}}{C_6H_5ONa} + \underset{\substack{\text{(Methyl}\\\text{chlorid.)}}}{CH_3Cl} = \underset{\text{(Anisol.)}}{C_6H_5OCH} + \underset{\substack{\text{(Sodium}\\\text{chlorid.)}}}{NaCl}$$

After the reaction the alcohol may be evaporated off to use over again and the oily liquid, composed mostly of anisol, run to an apparatus where it may be distilled with steam for purifying or also distilled directly. The sodium chlorid formed during the reaction and separated can be used over again for making methyl chlorid.

Having now fully described my invention, what I claim, and desire to protect by Letters Patent, is—

1. The improved process of making phenol esters consisting in dissolving caustic alkalies and phenol in alcohol and passing into this alcoholic solution of alkaline phenylate the halogen hydrocarbon compound corresponding to the alcohol group which is intended for the phenol ester.

2. The improved process of making anisol by means of the reaction between methyl chlorid and an alkaline phenylate in alcoholic solution.

In testimony of which invention I have hereunto set my hand, at Philadelphia, on this 26th day of May, 1905.

FIN SPARRE.

Witnesses:
　M. M. HAMILTON,
　THORNLEY B. WOOD.